United States Patent Office 3,440,218
Patented Apr. 22, 1969

3,440,218
POLY(AMIDE-ESTERS) OF AROMATIC COMPOUNDS
John R. Caldwell, Kingsport, Tenn., assignor to Eastman Kodak Company, Rochester, N.Y., a corporation of New York
No Drawing. Continuation-in-part of application Ser. No. 433,453, Feb. 17, 1965. This application Feb. 5, 1968, Ser. No. 702,768
Int. Cl. C08g *20/30*
U.S. Cl. 260—47          11 Claims

ABSTRACT OF THE DISCLOSURE

Linear, high molecular weight poly(amide-esters) having improved resistance to oxidation and a high degree of surface hardness are prepared from dicarboxylic acids (such as terephthalic acid) and diacyl derivatives of aminohydroxy substituted aromatic compounds (such as 4'-acetoxyacetanilide).

---

This application is a continuation-in-part of Caldwell U.S. Ser. No. 433,453, filed Feb. 17, 1965, now abandoned.

This invention relates to new poly(amide-esters) which contain aromatic nuclei as part of the molecular chain. More particularly, this invention relates to poly(amide-esters) prepared from aromatic compounds that contain an amino group and a hydroxyl group attached to an aromatic nucleus.

It is known in the art to make polyesters of aromatic dihydroxy compounds, such as hydroquinone and bisphenol A, by heating the diacetyl derivatives of such compounds with dicarboxylic acids. It is also known to make polyamides by heating aromatic diamines with dicarboxylic acids and to make poly(amide-esters) by reacting a dicarboxylic acid with compounds containing aliphatic amino groups and aliphatic hydroxyl groups. However, the compounds known to the prior art do not possess the unique combination of valuable properties which are possessed by the compounds of this invention.

It is an object of this invention to produce a linear, high molecular weight poly(amide-ester) from aromatic amino-hydroxy compounds.

Another object of this invention is to provide linear poly(amide-esters) which possess excellent resistance to oxidation when exposed to air at 150° C. or higher and which combine toughness with a high degree of surface hardness.

A further object of this invention is to provide linear, thermoplastic poly(amide-esters) which may be readily fabricated to form fibers, films, and molded objects.

It is another object of this invention to provide films and molded objects of linear thermoplastic poly(amide-esters) which are characterized by excellent resistance to scuffing and surface abrasion.

These and other objects are attained by the practice of this invention, at least one embodiment of which comprises providing a highly polymeric, linear poly(amide-ester) which is composed essentially of recurring units having the formula:

(I)
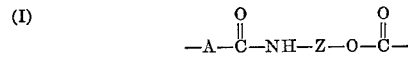

wherein A is a divalent radical selected from the group consisting of aliphatic, alicyclic, and aromatic radicals and Z is a divalent aromatic radical, the amide group and the ester group being attached directly to the aromatic nucleus of the radical Z. It is preferred that the amide and ester groups be present on nonadjacent carbon atoms on the divalent aromatic radical Z.

The novel poly-amide-esters of this invention are characterized in that they have melting points of 150° to 300° C. or higher. These polymers are of particular value because they combine toughness with a high degree of surface hardness. They are thermoplastic and are readily fabricated by the usual methods to form fibers, films, and molded objects. Films and molded objects of these polymers are characterized by excellent resistance to scuffing and surface abrasion. The polymers also possess excellent resistance to oxidation when exposed to air at 150° C. or higher.

The novel poly(amide-esters) of this invention are obtained by condensing equimolar proportions of (1) a dicarboxylic acid having the formula:

wherein A is a divalent radical selected from the group consisting of aliphatic, alicyclic, and aromatic radicals and (2) a diacyl derivative of an aminohydroxy substituted aromatic compound having the formula:

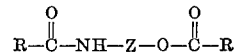

wherein Z is a divalent aromatic radical and R is a lower alkyl group (i.e., R is a straight or branched chain aliphatic hydrocarbon radical having from one to six carbon atoms, such as methyl, ethyl, propyl, isopropyl, butyl, i-butyl, t-butyl, pentyl, and hexyl).

The dicarboxylic acid which may be used to prepare the poly(amide-esters) of this invention may be any aliphatic, aromatic, or alicyclic dicarboxylic acid which is conventionally used in the production of linear polyesters. Examples of such dicarboxylic acids include oxalic acid; carbonic acid; succinic acid; glutaric acid; adipic acid; azelaic acid; sebacic acid; dimethylmalonic acid; 3,3-diethylsuccinic acid; isophthalic acid; terephthalic acid; phthalic acid; 1,2- and 1,4-cyclohexanedicarboxylic acid; 1,2- and 1,3-cyclopentanedicarboxylic acid; etc.

There are several types of aminohydroxy substituted aromatic compounds, the diacyl derivatives of which may be used to prepare the poly(amide-esters) of this invention. The compounds are all characterized in that they contain a hydroxyl group and an amino group attached to the same or different aromatic rings. Examples of different types of such compounds are as follows:

Monocyclic compounds (e.g., benzene derivatives) which may be represented by the general structure:

(II)
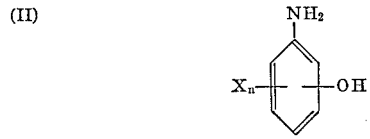

wherein X is a member selected from the group consisting of a phenyl group, an alkyl group containing from one to four carbon atoms, chloro, and bromo, and $n$ has a value of from 0 to 4. Typical examples of this class include: m-aminophenol, p-aminophenol, 2-methyl-4-aminophenol, o-aminophenol, 2-methyl-3-aminophenol, 3-methyl-5-aminophenol, 2 - chloro-4-aminophenol, 3-chloro-5-aminophenol, 3-chloro-4-aminophenol, 2-chloro-5-methyl-4-aminophenol, the isomeric amino-xylenols, 5-phenyl-3-aminophenol, 3-isopropyl-5-aminophenol, and 2-ethyl-4-amino-phenol. The linear poly(amide-esters) prepared from the diacyl derivatives of this class of compounds are characterized by having recurring units of the Formula I above, in which the radical Z has the general formula:

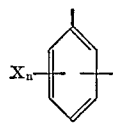

wherein X and *n* are the same as defined above.

Fused ring compounds (e.g., naphthalene and anthracene derivatives) which may be represented by the general structure:

(III)

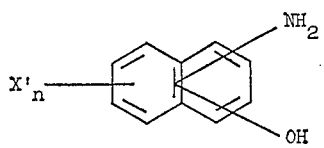

wherein X' is a member selected from the group consisting of a phenyl group, an alkyl group containing from one to four carbon atoms, chloro, and bromo, and *n* has a value of from 0 to 4. The above general structure (III) will be understood to indicate that the amino group and the hydroxyl group may be substituted on either of the fused rings, or that the amino group may be on one ring and the hydroxyl group on the other ring. Typical examples of this class include: 3-amino-1-naphthol, 4-amino-1-naphthol, 5-amino-1-naphthol, 6-amino-1-naphthol, 7-amino-1-naphthol, 8-amino-1-naphthol, 4-amino-2-naphthol, 6-amino-2-naphthol, 4-amino-6-methyl-1-naphthol, 4-amino-6 - phenyl - 1-naphthol, 5-amino-7-chloro-1-naphthol, and 7 - amino - 3 - methyl-2-naphthol. Poly(amide-esters) prepared from the diacyl derivatives of this group of compounds are composed essentially of recurring units having the Formula I above, in which the radical Z has the general formula:

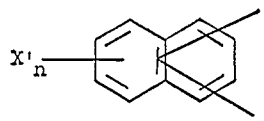

wherein X' and *n* are the same as defined above. Such compounds possess improved surface hardness associated with increased elastic modulus even as compared to poly(amide-esters) prepared from compounds having the above general structure (II).

Multiple independent ring compounds [e.g., diphenyl and bis(phenyl)methane derivatives] which may be represented by the general structures:

(IV)

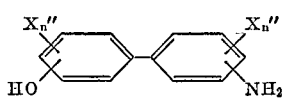

and (V)

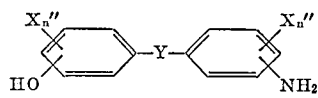

wherein X" is a member selected from the group consisting of a phenyl group, an alkyl group containing from one to four carbon atoms, chloro, and bromo, *n* has a value of from 0 to 4, and Y is a member selected from the group consisting of —O—, —S—, —SO$_2$—, —CH$_2$—,

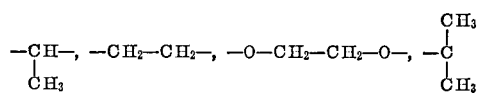

and

Typical examples of this class of compounds include: 4 - amino - 4' - hydroxydiphenyl, 3 - amino-4'-hydroxydiphenyl, 1-phenyl-4-amino-4'-hydroxydiphenyl, 4-amino-4'-hydroxydiphenyl ether, 1-phenyl-4-amino-4'-hydroxydiphenyl ether, 4-amino-3'-hydroxydiphenylmethane, 4-methyl - 3 - hydroxy-4'-aminodiphenyl ether, 4-amino-4'-hydroxydiphenylsulfide, 4 - amino-4'-hydroxydiphenylsulfone, p-[1-(p-aminophenyl)ethyl]phenol, p-[2-(m-aminophenyl)ethyl]phenol, p - [2 - (p-aminophenoxy)ethoxy]phenol, p-[1-(p-aminophenyl)-1-methylethyl]phenol, and 4"-amino-p-terphenyl-4-ol. Poly(amide-esters) prepared from the diacyl derivatives of this group of compounds are composed essentially of recurring units having the above Formula I in which the radical Z has the general formulas:

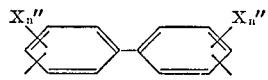

or

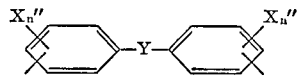

wherein X", *n*, and Y are the same as described above. These polymers possess improved solubility in methylene chloride and other solvents useful for solution spinning of fibers and casting of film, even as compared to poly (amide-esters) prepared from compounds having the above general structure (II).

The diacyl derivatives of the above-described amino-hydroxy substituted aromatic compounds are made by known methods employing lower acyl halides or anhydrides. The acetyl derivatives are preferred but the propionyl, butyryl, or isobutyryl derivatives are examples of others which may also be used. Acetylation may be accomplished through the action of ketene.

The condensation of the dicarboxylic acid and the diacyl derivative of an amino hydroxy substituted aromatic compound is effected by heating approximately equal molecular amounts of these compounds at a temperature of from about 240° to 350° C. The reaction is carried out with good agitation in order to facilitate the escape of the volatile acid from the viscous melt.

Where the polymeric product melts higher than about 280° C., it is frequently advantageous to use a two-stage process for its preparation. According to this technique, a prepolymer having an inherent viscosity of about 0.2 to 0.3 is prepared by stirring a melt of the reactants under a vacuum. The prepolymer is then cooled and ground to a particle size of about 0.03 inch or smaller. The particles of the prepolymer are then heated in a vacuum at a temperature sufficient to accomplish further polymerization but below the melting point of the polymer, preferably at a temperature of from about 250° to about 300° C.

Whenever the term "inherent viscosity" (I.V.) is used in this application, it will be understood to refer to viscosity determinations made at 25° C. using 0.25 gram of polymer per 100 ml. of a solvent compound of 60 percent phenol and 40 percent tetrachloroethane.

In preparing the linear polymers of this invention, catalytic condensing agents (such as compounds of magnesium, tin, antimony, aluminum, cobalt, lead, zinc, and cerium and combinations thereof) may be used. The catalytic condensing agent is generally employed in an amount of from about 0.001 percent to about 0.1 percent based on the weight of the materials being condensed. There is nothing critical in the amount or type of catalyst used to effect the condensation.

Many of the poly(amide-esters) of this invention are soluble in volatile solvents such as methylene chloride, chloroform, and the like. Films or fibers may be cast from solutions by conventional techniques. Moreover, a solution of a poly(amide-ester) of this invention may be used to form a protective coating of the polymer on an article.

Films and fibers may also be melt spun from the poly(amide-esters) of this invention. These polymers may also be used to form a molded object by conventional injection, compression, or extrusion techniques.

The following examples are included for a better understanding of the invention.

EXAMPLE 1

A mixture of 10.5 grams of sebacic acid, 9.65 grams of 4'-acetoxyacetanilide and 0.01 gram of dibutyltin oxide is placed in a reaction vessel equipped with a stirrer and an inlet tube for maintaining a nitrogen atmosphere over the reaction mixture. The reaction vessel is heated under a nitrogen atmosphere with stirring to a temperature of 240° C., at which point acetic acid begins to distill from the vessel. The reaction mixture is heated with stirring at this temperature for 15 minutes. The temperature of the reaction mixture is then raised to 260° C. A vacuum of 100 mm. of Hg is applied to remove most of the acetic acid. A vacuum of 0.05 mm. of Hg is then applied and stirring at a temperature of 260° C. is continued for 2.5 hours by which time a viscous melt has been obtained. The inherent viscosity of the poly(amide-ester) is 0.56. The melting point, as determined by differential thermal analysis, is 221° C. The softening range, as determined on the hot-stage of a microscope, is 223° to 250° C. Clear, tough films are obtained by pressing the polymer at 250° to 270° C. Fibers are made by melt-spinning the polymer. Objects molded from this polymer are transparent and have high impact strength.

EXAMPLE 2

Using the process of Example 1, a poly(amide-ester) is prepared from 4'-acetoxyacetanilide and suberic acid. The inherent viscosity of the product is 0.60. It melts at 248° to 255° C. on the hot-stage of a microscope. The melting point, as determined by differential thermal analysis, is 248° C. It has been found to be useful in the manufacture of fibers, films, and molded objects.

EXAMPLE 3

A mixture of 5.79 grams of 4'-acetoxyacetanilide, 4.38 grams of adipic acid, and 0.01 gram of dibutyltin oxide are placed in a flask equipped with a stirrer and an inlet for purified nitrogen. The mixture is stirred at 240° to 260° C. for about 30 minutes, and a vacuum of 100 mm. of Hg is applied to remove most of the acetic acid formed by the reaction. A vacuum of 0.1 mm. of Hg is then applied and stirring is continued. The melt solidifies after 15 to 20 minutes. The prepolymer thus obtained is ground to a particle size of 0.03 inch and the particles are then heated in a vacuum at 240° C. for two hours. There is thus obtained a poly(amide-ester) having a melting point of 282° to 292° C.

EXAMPLE 4

Using the process of Example 2, a poly(amide-ester) is prepared from isophthalic acid and 4'-acetoxyacetanilide. The product has a melting point of 300° C. Fibers and films are formed by conventional methods from solutions of the product in dimethylsulfoxide, cresol, and butyrolactone.

EXAMPLES 5 TO 20

A series of poly(amide-esters) is made from the acids and the diacetyl derivatives of the aminohydroxy substituted aromatic compounds set forth in the following table. where the resultant poly(amide-ester) melts below about 280° C., the process of Example 1 is used. Where the product melts above about 280° C., the process of Example 3 is followed. The softening point range for each of the products is given in the table. The poly(amide-esters) thus obtained are useful in a variety of ways. Thus, the products of Examples 10 to 20 are used as molding plastics for the formation of molded objects; the products of Examples 13, 14, 15, 16, and 19 are used in the production of films; and the products of Examples 13, 14, 15, and 16 are used in the production of fibers.

TABLE

| Ex. | Acid | Diacetyl derivative of— | Softening point (° C.) |
|---|---|---|---|
| 5 | Pimelic | 5-amino-1-naphthol | 280-310 |
| 6 | Sebacic | do | 260-285 |
| 7 | Azelaic | 6-amino-2-naphthol | 265-280 |
| 8 | 2-methyladipic | do | 260-278 |
| 9 | 1,12-dodecanedioic | do | 250-275 |
| 10 | Adipic | 4-amino-2-methylphenol | 240-250 |
| 11 | Pimelic | do | 230-245 |
| 12 | Isophthalic | do | 270-290 |
| 13 | Pimelic | 4-amino-4'-hydroxydiphenyl | 285-300 |
| 14 | Sebacic | do | 260-270 |
| 15 | 1,12-dodecanedicarboxylic | do | 248-260 |
| 16 | 70 mole percent isophthalic and mole percent suberic. | do | 280-300 |
| 17 | Pimelic acid | 4-amino-4'-hydroxydiphenyl ether | 265-280 |
| 18 | 80 mole percent sebacic and 20 mole percent terephthalic | do | 245-265 |
| 19 | 1,4-cyclohexanedicarboxylic | 3-amino-3'-hydroxy-4,4'-dimethyldiphenylmethane | 235-250 |
| 20 | Pimelic | 2-phenyl-4-aminophenol | 240-260 |

EXAMPLE 21

Following the process of Example 1, a poly(amide-ester) is prepared from the diacetyl derivative of m-aminophenol and isophthalic acid. Dibutyltin diacetate is used as the catalyst instead of dibutyltin oxide. Films cast from a solution of the product in tetramethylene sulfone are characterized by surface hardness.

Other similar polyesters may be prepared employing the procedures set forth in the preceding examples and in the more general description of this invention set forth hereinabove.

The invention has been described in detail with particular reference to preferred embodiments thereof, but it will be understood that variations and modifications can be effected within the spirit and scope of the invention as described hereinabove and as defined in the appended claims.

I claim:

1. A highly polymeric, linear poly(amide-ester) composed essentially of recurring units having the formula:

wherein A is a divalent radical selected from the group consisting of aliphatic, alicyclic, and aromatic radicals and Z is a divalent aromatic radical selected from the group consisting of radicals having the formulas:

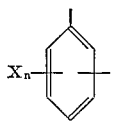

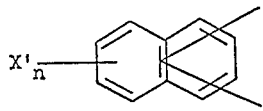

and

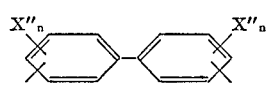

wherein each X, X', and X" is a member selected from the group consisting of a phenyl group, an alkyl group containing from one to four carbon atoms, chloro, and bromo, n has a value of from 0 to 4, and Y is a member selected from the group consisting of —O—, —S—, —SO₂—, —CH₂—,

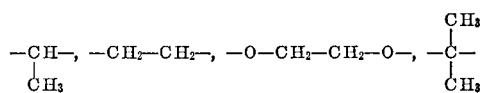

and

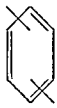

the amide and ester groups being attached directly to the aromatic nucleus of said radical Z.

2. A linear poly(amide-ester) as defined by claim 1 wherein said amide and ester groups are attached to non-adjacent carbon atoms on said divalent radical Z.

3. A fiber of poly(amide-ester) as defined by claim 1.

4. A film of a poly(amide-ester) as defined by claim 1.

5. A linear poly(amide-ester) as defined by claim 1 wherein said radical Z has the formula:

6. A linear poly(amide-ester) as defined by claim 1 wherein said radical Z has the formula:

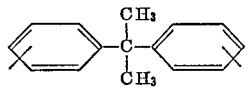

7. A linear poly((amide-ester) as defined by claim 1 wherein said radical A is an aliphatic radical containing from four to eight carbon atoms.

8. A process for preparing a highly polymeric, linear poly(amide-ester), which process comprises condensing, at a temperature of from about 240 to 350° C., equimolar proportions of (1) a dicarboxylic acid having the formula:

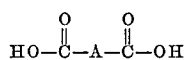

wherein A is a divalent radical selected from the group consisting of aliphatic, alicyclic, and aromatic radicals and (2) a diacyl derivative of an aminohydroxy substituted aromatic compound having the formula:

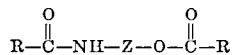

wherein R is a lower alkyl group and Z is a divalent aromatic radical selected from the group consisting of radicals having the formulas:

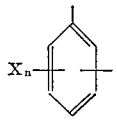

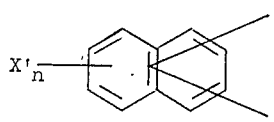

and

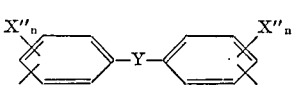

wherein each X, X', and X" is a member selected from the group consisting of a phenyl group, an alkyl group containing form one to four carbon atoms, chloro, and bromo, n has a value of from 0 to 4, and Y is a member selected from the group consisting of —O—, —S—, —SO₂—, —CH₂—,

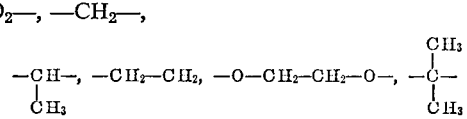

and

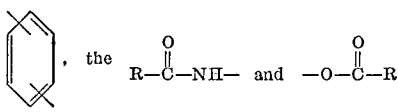

groups being attached directly to the aromatic nucleus of said radical Z.

9. A process as defined by claim 8 wherein said radical Z has the formula:

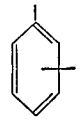

10. A process as defined by claim 8 wherein said radical Z has the formula:

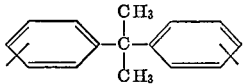

11. A process as defined by claim 8 wherein said radical A is an aliphatic radical containing from four to eight carbon atoms.

References Cited

UNITED STATES PATENTS 3,272,774   9/1966   Moyer _____ 260—47
3,272,776   9/1966   Caldwell _____ 260—47

WILLIAM H. SHORT, *Primary Examiner.*

L. L. LEE, *Assistant Examiner.*

U.S. Cl. X.R.

260—75, 78